(12) United States Patent
Sherman et al.

(10) Patent No.: US 9,879,157 B2
(45) Date of Patent: Jan. 30, 2018

(54) MICROSTRUCTURED TRANSFER TAPES

(71) Applicant: 3M INNOVATIVE PROPERTIES COMPANY, St. Paul, MN (US)

(72) Inventors: Audrey A. Sherman, St. Paul, MN (US); Kevin R. Schaffer, Woodbury, MN (US); Robert L. Brott, Woodbury, MN (US); Rolf W. Biernath, Wyoming, MN (US); Joseph W. Woody, V, St. Paul, MN (US); John A. Wheatley, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/349,020

(22) PCT Filed: Sep. 26, 2012

(86) PCT No.: PCT/US2012/057169
§ 371 (c)(1),
(2) Date: Apr. 1, 2014

(87) PCT Pub. No.: WO2013/052319
PCT Pub. Date: Apr. 11, 2013

(65) Prior Publication Data
US 2014/0248458 A1 Sep. 4, 2014

Related U.S. Application Data

(60) Provisional application No. 61/543,442, filed on Oct. 5, 2011.

(51) Int. Cl.
*B32B 7/12* (2006.01)
*C09J 7/02* (2006.01)
(Continued)

(52) U.S. Cl.
CPC ............. *C09J 7/02* (2013.01); *B29C 65/5007* (2013.01); *B44C 1/105* (2013.01); *C09J 7/00* (2013.01);
(Continued)

(58) Field of Classification Search
CPC .......... C09J 7/00; C09J 9/00; C09J 2201/606
See application file for complete search history.

(56) References Cited

U.S. PATENT DOCUMENTS 3,786,116 A    1/1974  Milkovich
3,842,059 A   10/1974  Milkovich
(Continued)

FOREIGN PATENT DOCUMENTS

CN        2869926      2/2007
CN       101639201     2/2010
(Continued)

OTHER PUBLICATIONS

Anandan, "LED Backlight: Enhancement of picture quality on LCD screen", Proc of ASID, Oct. 8-12, 2006, pp. 130-134.
(Continued)

*Primary Examiner* — Victor S Chang
(74) *Attorney, Agent, or Firm* — Jeffrey M. Olofsen

(57) ABSTRACT

Transfer tapes include an optically transparent adhesive layer with a first major surface and a second major surface, with at least one of the major surfaces including a microstructured pattern that is a permanent feature of the adhesive surface. The microstructured surface alters the direction of light. The optically transparent composition may include a low Tg polymeric component with a Tg of less than 20° C., and an acid or base functionality, and a high Tg polymeric component with a Tg of greater than 20° C., and an acid or base functionality, such that the functionality of the low Tg polymeric component and the functionality of the high Tg
(Continued)

polymeric component form an acid-base interaction when mixed. The transfer tapes can be adhered to substrates to provide a microstructured surface to the substrate surface.

20 Claims, 4 Drawing Sheets

(51) Int. Cl.
    *C09J 7/00*     (2006.01)
    *C09J 9/00*     (2006.01)
    *F21V 8/00*     (2006.01)
    *B44C 1/10*     (2006.01)
    *B29C 65/50*     (2006.01)

(52) U.S. Cl.
    CPC .............. *C09J 9/00* (2013.01); *G02B 6/0025* (2013.01); *C09J 2201/606* (2013.01); *C09J 2201/622* (2013.01); *C09J 2433/00* (2013.01); *Y10T 428/1476* (2015.01); *Y10T 428/24802* (2015.01)

(56) References Cited

U.S. PATENT DOCUMENTS

| | | | |
|---|---|---|---|
| 4,045,517 A * | 8/1977 | Guerin et al. | 525/203 |
| 4,619,979 A | 10/1986 | Kotnour | |
| 4,693,935 A | 9/1987 | Mazurek | |
| 4,737,559 A | 4/1988 | Kellen | |
| 4,833,179 A | 5/1989 | Young | |
| 4,843,134 A | 6/1989 | Kotnour | |
| 5,637,646 A | 6/1997 | Ellis | |
| 5,650,215 A | 7/1997 | Mazurek | |
| 5,995,690 A | 11/1999 | Kotz | |
| 6,132,652 A | 10/2000 | Higuchi | |
| 6,197,397 B1 | 3/2001 | Sher | |
| 6,572,236 B2 | 6/2003 | Suzuki | |
| 6,720,387 B1 | 4/2004 | Stark | |
| 6,795,177 B2 | 9/2004 | Doyle | |
| 8,133,572 B2 * | 3/2012 | Gaides et al. | 428/172 |
| 2003/0223137 A1 | 12/2003 | Araki | |
| 2003/0223216 A1 * | 12/2003 | Emmons | G02B 5/045 362/602 |
| 2004/0202879 A1 | 10/2004 | Xia | |
| 2007/0000606 A1 | 1/2007 | Steelman | |
| 2007/0121227 A1 | 5/2007 | Wang | |
| 2007/0188864 A1 * | 8/2007 | Duncan | C08F 265/04 359/489.11 |
| 2007/0212535 A1 | 9/2007 | Sherman | |
| 2007/0229401 A1 | 10/2007 | Kim | |
| 2009/0126469 A1 | 5/2009 | Walker | |
| 2009/0213619 A1 | 8/2009 | Nakamoto | |
| 2010/0055409 A1 | 3/2010 | Cho | |
| 2010/0067257 A1 | 3/2010 | Meis | |
| 2011/0039099 A1 | 2/2011 | Sherman | |
| 2011/0064916 A1 | 3/2011 | Sherman | |

FOREIGN PATENT DOCUMENTS

| | | |
|---|---|---|
| CN | 101762904 | 6/2010 |
| EP | 1329762 | 7/2003 |
| JP | 2007-311330 | 11/2007 |
| KR | 2008-0102749 | 11/2008 |
| WO | WO 1984-03837 | 10/1984 |
| WO | WO 1997-33945 | 9/1997 |
| WO | WO 2005/023913 | 3/2005 |
| WO | WO 2007/030640 | 3/2007 |
| WO | WO 2007/106225 | 9/2007 |
| WO | WO 2008-045681 | 4/2008 |
| WO | WO 2009/018253 | 2/2009 |
| WO | WO 2009/066056 | 5/2009 |
| WO | WO 2011-091026 | 7/2011 |

OTHER PUBLICATIONS

Kawakami, "Silicone Macromers for Graft Polymer Synthesis", Polymer Journal, Apr. 1982, vol. 14, No. 11, pp. 913-917.

Kawakami, "Synthesis and Copolymerization of Polysiloxane Macromers", ACS Polymer Preprints, Apr. 1984, vol. 25, No. 1, pp. 245-246.

Kawakami, "Synthesis of Silicone graft polymers and a study of their surface active properties", Makromol. Chem., 1984, vol. 185, pp. 9-18.

Smith, Modern Optical Engineering, 104-105 (1966).

International Search Report for PCT International Application No. PCT/US2012/057169, dated Feb. 28, 2013 4 pages.

* cited by examiner

MICROSTRUCTURED TRANSFER TAPES

FIELD OF THE DISCLOSURE

The present disclosure relates generally to transfer tapes, especially transfer tapes that have at least one microstructured surface. The transfer tapes may be optically active.

BACKGROUND

Adhesives have been used for a variety of marking, holding, protecting, sealing and masking purposes. Adhesive tapes generally comprise a backing, or substrate, and an adhesive. One specific type of tape, called a transfer tape, does not comprise a backing, but rather is a standalone adhesive layer. Among the types of adhesives used in tapes, are pressure sensitive adhesives and heat activated adhesives, with pressure sensitive adhesives being the more common.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Among the adhesive articles that have been prepared are adhesive articles that contain microstructured surfaces. The microstructured surface can be imparted upon the adhesive layer by contact with a microstructured molding tool or microstructured release liner. U.S. Pat. No. 5,650,215 (Mazurek et al.) teaches methods for preparing pressure sensitive adhesives with microstructured surfaces. The microstructured surfaces can provide such useful properties as temporary repositionability, permanent repositionability, and self-debonding.

SUMMARY

Disclosed herein are transfer tapes and uses for transfer tapes, including methods for using transfer tapes to prepare articles, especially optical articles. Also disclosed are the articles, especially optical articles, that are prepared from transfer tapes.

Some embodiments of the disclosed transfer tapes comprise an adhesive layer with a first major surface and a second major surface. The adhesive layer comprises an optically transparent composition, and at least one of the first major surface or the second major surface comprises a microstructured pattern on the surface such that the microstructured pattern is a permanent feature of the adhesive surface. The microstructured surface alters the direction of light. The optically transparent composition comprises a crosslinked polymeric composition. In some embodiments, the crosslinked polymeric composition comprises a low Tg polymeric component with a Tg of less than 20° C., and an acid or base functionality, and a high Tg polymeric component with a Tg of greater than 20° C., and an acid or base functionality, such that the functionality of the low Tg polymeric component and the functionality of the high Tg polymeric component form an acid-base interaction when mixed.

Also disclosed are methods for preparing articles, in some embodiments the method comprises preparing a transfer tape comprising an adhesive layer and a release liner, attaching the transfer tape to a substrate, and removing the release liner of the transfer tape. The transfer tape comprises an adhesive layer with a first major surface and a second major surface. The adhesive layer comprises an optically transparent composition, and at least one of the first major surface or the second major surface comprises a microstructured pattern on the surface such that the microstructured pattern is a permanent feature of the adhesive surface. The microstructured surface alters the direction of light. The optically transparent composition comprises a crosslinked polymeric composition. In some embodiments, the crosslinked polymeric composition comprises a low Tg polymeric component with a Tg of less than 20° C., and an acid or base functionality, and a high Tg polymeric component with a Tg of greater than 20° C., and an acid or base functionality, such that the functionality of the low Tg polymeric component and the functionality of the high Tg polymeric component form an acid-base interaction when mixed.

Also disclosed are articles, in some embodiments the articles comprise a substrate with at least one exterior surface, and a transfer tape adhered to the substrate surface. The transfer tape comprises an adhesive layer with a first major surface and a second major surface. The adhesive layer comprises an optically transparent composition, and at least one of the first major surface or the second major surface comprises a microstructured pattern on the surface such that the microstructured pattern is a permanent feature of the adhesive surface. The microstructured surface alters the direction of light. The optically transparent composition comprises a crosslinked polymeric composition. In some embodiments, the crosslinked polymeric composition comprises a low Tg polymeric component with a Tg of less than 20° C., and an acid or base functionality, and a high Tg polymeric component with a Tg of greater than 20° C., and an acid or base functionality, such that the functionality of the low Tg polymeric component and the functionality of the high Tg polymeric component form an acid-base interaction when mixed. In some embodiments, the article comprises a light guide.

BRIEF DESCRIPTION OF THE DRAWINGS

The present application may be more completely understood in consideration of the following detailed description of various embodiments of the disclosure in connection with the accompanying drawings.

Figure 1:
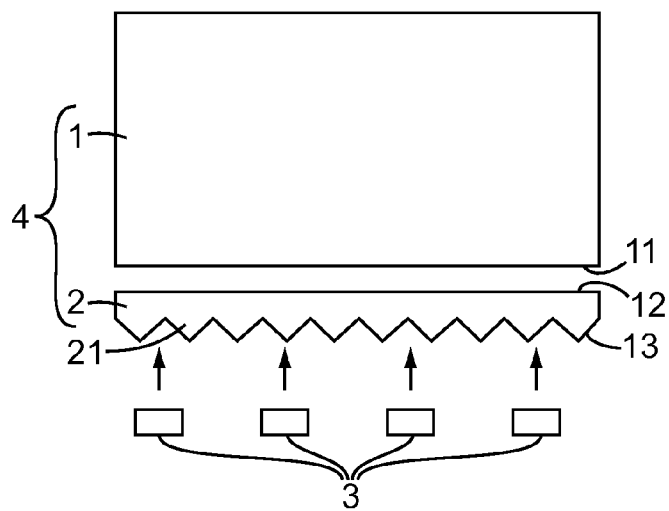
FIG. 1 shows a schematic plan view of one embodiment of a backlight that includes a light guide module and an array of light emitting diodes.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Double-sided tapes, also called "transfer tapes" are adhesive tapes that have adhesive on both exposed surfaces. In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. In this disclosure, transfer tapes are prepared that comprise a single layer of adhesive. The transfer tapes have at least one side that is a microstructured surface.

Typically, transfer tapes are used to adhere two different substrates, that is to say they are used to form three layer laminates that contain: a substrate/transfer tape/a different substrate. Laminates of this type are formed using a wide range of substrates, such as, for example, papers, sheets, films, plates, etc. The transfer tapes of the present disclosure, in contrast, do not generally adhere two different substrates to each other, but rather are adhered to one substrate and have an exposed outer surface that is not adhered to a substrate. This exposed outer surface comprises a microstructured surface. Typically, this microstructured surface is designed to retain its microstructured shape and not to flow or collapse as is common with microstructured adhesive surfaces.

Rather than adhering two different substrates, the transfer tapes of this disclosure are adhered to a substrate to provide a microstructured surface layer to a substrate. This feature can be used to provide a variety of different articles with structured surfaces. Among the types of articles that can be prepared with the transfer tapes of this disclosure are "light guides". Light guides are devices designed to transport light from a light source to a point at some distance with minimal loss. Light is transmitted through a light guide by means of total internal reflection. Light guides are used in a wide array of devices including backlight devices and luminaires.

Backlights, and some luminaires, use a light source to inject light into an input surface of a light guide to produce diffused illumination over an output surface of the light guide. Examples of output surfaces include Liquid Crystal Display (LCD) panels. Many backlight devices such as LCDs utilize Cold Cathode Fluorescent Lamps (CCFL) for backlighting. Recently, manufacturers have begun replacing CCFLs with other types of light sources, such as light-emitting diodes (LEDs), which are more energy efficient and environmentally friendly than CCFLs.

In backlighting applications for display panels, the main difference between CCFLs and LEDs is that CCFLs continuously emit spatial light in a linear manner, while LEDs combine spaced apart single-point light sources arranged into an LED light bar. As such, CCFLs typically provide uniform illumination. LED light bars, on the other hand, generally are made up of arrays including single-point highly efficient LEDs as light sources, and as the distance between adjacent LEDs increases, certain areas directly in front of each LED may appear brighter, and the areas between LEDs appear darker, thereby resulting in non-uniform brightness of the areas of the light guide closest to the LEDs.

This non-uniform brightness issue has been addressed in PCT Publication WO 2011/091026. In this publication, a light guide module is described that includes a light guide having an input surface to receive light. The light guide module also includes a structured surface layer that has a first surface and a second surface, where the first surface is attached to the input surface of the light guide by adhesives, welding, or other suitable technique. The second surface includes microstructures that are operable to spread incident light in the plane of the light guide and is positioned to receive light emitted from an array of light emitting diodes. The PCT publication goes on to describe techniques for light spreading to counteract the non-uniform brightness caused by LEDs by injection molding the input surface to create protrusion or depressions. However, this technique is complicated and may not be particularly effective at creating a microstructured surface, especially on relatively large surfaces, so the techniques taught by the PCT publication, of making a separate structured surface layer and attaching it to the input surface is less desirable than the transfer tape techniques of this disclosure.

In the present disclosure, the transfer tape comprises an adhesive layer that is a structured surface layer. In this way, the structured surface layer is also the adhesive to attach the structured surface layer to the input surface of the light guide. There are numerous advantages to having a transfer tape be the structured surface layer. One advantage is that the transfer tape does not require an additional adhesive layer to adhere the structured surface layer to the input surface. The use of an additional adhesive layer adds two additional interfaces (the interface where the structured surface layer is attached to the adhesive, and the interface where the adhesive is attached to the input surface) for light to pass through. Each interface can produce additional reflection with consequent light loss. Another similar advantage is that unification of the structured surface layer and the adhesive in a single construction means that the unified construction comprises a single material composition. Just as light can be lost at interfaces, light can also be lost through scattering, diffraction, reflection, etc when it passes through layers of different materials. Yet another advantage of using a transfer tape as a structured surface layer, is that the use of a microstructured adhesive layer as the structured surface layer can provide ease of manufacturing and handling. Typically, an adhesive composition is coated onto a structured release surface, such as a release liner, to generate the transfer tape. The transfer tape can then be slit to the desired size and shape, transported to the use site with the microstructured surface protected by the release liner, and applied as a tape to the input surface. Finally, because the transfer tape is an adhesive, it can overlay imperfections in the input surface without requiring that the input surface undergo additional preparation steps such as polishing. Typically, imperfections in the input surface such as scratches, bumps, depressions and the like need to be removed to provide a smooth surface to ensure proper light transmittal. However, since the structured surface layer is an adhesive, the adhesive surface will fill in scratches and depressions and surround bumps on the input surface to overlay these imperfections and, especially if the refractive index of the adhesive is very similar to or matches with the refractive index of the input surface, will make the structured surface layer a part an extension of the input surface and not a separate layer. This attribute simplifies the process steps needed to prepare the light guide and eliminates tedious and expensive polishing steps on the input surface.

Unless otherwise indicated, all numbers expressing feature sizes, amounts, and physical properties used in the specification and claims are to be understood as being modified in all instances by the term "about" Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "LED" means any solid-state light source including conventional LEDs and lasers, alone or in combination. This includes both packaged and unpackaged LEDs. It also includes LEDs of a single color bin, multiple color bins, or of different colors, such as Red, Green, and Blue LEDs, either individually or in combination. The LEDs may be enhanced with color modifying materials such as phosphors, quantum dots, or other color modifying materials.

As used herein, the term "microstructure" means the configuration of features wherein at least 2 dimensions of the features are microscopic. The topical and/or cross-sectional view of the features must be microscopic.

As used herein, the term "microscopic" refers to features of small enough dimension so as to require an optic aid to the naked eye when viewed from any plane of view to determine its shape. One criterion is found in Modern Optic Engineering by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina. At typical working distance of 250 mm (10 inches), this yields a lateral dimension of 0.36 mm (0.0145 inch) for this object.

As used herein, the expressions "permanent microstructure" and "the microstructured pattern is a permanent feature of the adhesive surface" are used interchangeably and mean that the microstructures on the adhesive surface are designed not to disappear or collapse over time. Typically, microstructured adhesive surfaces, especially with optically transparent adhesives, are designed to remain only temporarily to permit air egress and then collapse and disappear.

As used herein, the term "optically active" when referring to a film means that the film produces an optical effect. Examples of films that produce an optical effect include transparent films, as well as films that produce additional optical effects such as, for example, light diffusion, light reflection, light refraction, and light polarization.

As used herein the term "silicone-modified" refers to polymers that contain silicone macromers. Macromers are macromolecular monomers. The terms "silicone" or "siloxane" are used interchangeably and refer to units with dialkyl or diaryl siloxane (—SiR$_2$O—) repeating units.

As used herein, the term "Tg" refers to the glass transition temperature of a polymer or mixture containing polymers. The glass transition temperature is measured using a Differential Scanning calorimeter (DSC).

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "(meth)acrylate" refers to monomeric acrylic or methacrylic esters of alcohols. Acrylate and methacrylate monomers or oligomers are referred to collectively herein as "(meth)acrylates". Polymers described as "(meth)acrylate-based" are polymers or copolymers prepared primarily (greater than 50% by weight) from (meth)acrylate monomers and may include additional ethylenically unsaturated monomers.

Unless otherwise indicated, "optically transparent" refers to an article, film or adhesive composition that has a high light transmittance over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze.

As used herein, the term "adjacent" when referring to layers or films, means that the layers or films are in close proximity to each other with no empty space between them. The layers or films may be touching, or there may be intervening layers or films.

The transfer tapes of this disclosure comprise an adhesive layer with a first major surface and a second major surface. At least one of the first major surface or the second major surface comprises a microstructured pattern on the surface such that the microstructured pattern is a permanent feature of the adhesive surface. The adhesive layer comprises an optically transparent composition. This composition comprises a crosslinked polymeric composition. The crosslinking of the composition aids in the retention of the microstructured pattern as a permanent feature of the adhesive surface. The crosslinks may be chemical crosslinks where a chemical bond links the polymeric components or in some embodiments physical crosslinks where there are interactions between polymeric components of the polymeric composition. These interactions may be ionic (such as the interaction between electronegative segments of one polymeric component and electropositive segments of another polymeric component) or physical interactions that cause phase separated microdomains from chemically similar segments of the polymeric components of polymeric composition. Crosslinked (meth)acrylate polymers are examples of suitable crosslinked polymeric compositions.

In many embodiments, the optically transparent composition comprises at least two components that are blended together to form the optically transparent composition. The two components are a low Tg polymeric component having a Tg of less than 20° C. and a high Tg polymeric component with a Tg of greater than 20° C. These two components each contain either an acid or base functionality such that when the two components are mixed they form an acid-base interaction, which for the purposes of this disclosure comprises crosslinking. The acid-base interaction that is present between the polymeric components may be described as a Lewis acid-base type interaction. Lewis acid-base interactions require that one chemical component be an electron acceptor (acid) and the other an electron donor (base). The electron donor provides an unshared pair of electrons and the electron acceptor furnishes an orbital system that can accommodate the additional unshared pair of electrons. The following general equation describes the Lewis acid-base interaction:

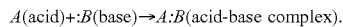

$A(\text{acid}) + :B(\text{base}) \rightarrow A:B(\text{acid-base complex})$.

This crosslinking by the formation of an acid-base complex is not chemical, i.e. there is no chemical bond formed between polymeric components, but is physical. These physical crosslinks have the advantage of being reversible. This permits the mixture of components to be more readily processed through either solvent-borne or solventless methods. In solution, or in the molten state, the physical crosslinks are very weak or nonexistent, but upon cooling or drying, the physical crosslinks form spontaneously and cause the mixture of components to form a crosslinked mass. This physical crosslinking is described in US Patent Publication No. 2004/0202879 (Xia et al.).

Other suitable materials that incorporate this physical crosslinking are described in US Patent Publication No. 2011/0039099 (Sherman et al.) which describe silicone-modified adhesive blends. The silicone-modified adhesive polymers in this publication contain silicone grafts which are prepared by copolymerizing vinyl-functional silicone macromers. In these materials, the silicone grafts give the adhesive layer temporary repositionability. Another advantage of the silicone-modified adhesive blends is that the silicone grafts tend to migrate to the adhesive layer surface when in the presence of low surface energy materials such as air or a release liner, but appear to migrate into the bulk of the adhesive when placed against a substrate. Since the transfer tapes of this disclosure, as described above, are not intended to adhere together two substrates, the microstructured surface of the adhesive is only in contact with a release liner and air, and therefore the silicone grafts tend to remain at the microstructured surface. The presence of the silicone grafts at or near the microstructured surface can be advantageous because they can serve to detackify the microstructured surface and also can tend to raise the refractive index of the microstructured surface. While either or both polymeric components can be made from silicone macromers, typically it is more desirable to modify only the low Tg polymeric component with silicone macromers, i.e. to make the low Tg polymeric component silicone-modified.

The first component of the two component blend is a low Tg polymeric component having a Tg of less than 20° C. This low Tg polymeric component may be a low Tg polymer, it may be a mix of polymers, or it may be a polymer or a mix of polymers with additional additives. The polymer or polymers and any additives should have sufficient compatibility that the resulting mixture forms the desired low Tg polymeric component. The low Tg polymeric component generally has an acid or base functionality such that it can form the above described acid-base interaction with the second polymeric component. In other words, if the first polymeric component has an acid functionality, the second polymeric component will have the complementary functionality (base functionality) such that an acid-base interaction is present between the polymeric components. Similarly, if the first polymeric component has a base functionality, the second polymeric component will have an acid functionality. In some embodiments, the low Tg polymeric component is a pressure sensitive adhesive. In some of the embodiments where the low Tg polymeric component is a pressure sensitive adhesive, the pressure sensitive adhesive includes one or more polymers and one or more tackifying resins.

The second component of the two component blend is a high Tg polymeric component with a Tg of greater than 20° C. This high Tg polymeric component may be a high Tg polymer, it may be a mix of polymers, or it may be a polymer or a mix of polymers with additional additives. The polymer or polymers and any additives should have sufficient compatibility that the resulting mixture forms the desired high Tg polymeric component. The high Tg polymeric component generally has an acid or base functionality such that it can form the above described acid-base interaction with the first polymeric component. In other words, if the first polymeric component has an acid functionality, the second polymeric component will have the complementary functionality (base functionality) such that an acid-base interaction is present between the polymeric components. Similarly, if the first polymeric component has a base functionality, the second polymeric component will have an acid functionality. In some embodiments, the high Tg polymeric component comprises a high Tg polymer.

The composition formed from the low Tg polymeric component and the high Tg polymeric component comprises an optically transparent composition. As stated above, optically transparent means that the composition has a high light transmittance over at least a portion of the visible light spectrum (about 400 to about 700 nm). In some embodiments, the composition is optically clear. Optical transparency and/or optical clarity is desirable because it is desired that light passing through the adhesive layer be unaltered in direction by the adhesive layer. In other words, incoming light is altered in direction by the microstructured surface of the adhesive layer as is described above and below, but upon entering the bulk of the adhesive layer, the light is not further altered in direction by passing through the bulk of the adhesive layer.

In some embodiments, one or both of the low Tg polymeric component and the high Tg polymeric component comprise (meth)acrylate polymers or copolymers. (Meth)acrylate polymers and copolymers are polymers produced by the polymerization of one or more (meth)acrylate monomers, and may include additional copolymerizable monomers, such as vinyl monomers.

(Meth)acrylate monomers are monofunctional unsaturated monomers that are (meth)acrylate esters of non-tertiary alkyl alcohols, the alkyl groups of which comprise from about 1 to about 20, or even 1 to about 18 carbon atoms. The alkyl groups can also include heteroatoms (e.g., oxygen or sulfur). Examples of suitable (meth)acrylate monomers include, but are not limited to, benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, hydroxy-ethyl methacrylate, hydroxy ethyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl. methacrylate, octadecyl acrylate, octadecyl methacrylate, n-octyl acrylate, n-octyl methacrylate, 2-phenoxy ethyl methacrylate, 2-phenoxy ethyl acrylate, propyl acrylate, propyl methacrylate, n-tetradecyl acrylate, n-tetradecyl methacrylate, and mixtures thereof.

When used, vinyl monomers can include vinyl esters (e.g., vinyl acetate), styrene, substituted styrene (e.g., alpha-methyl styrene), vinyl halide, vinyl propionate, and mixtures thereof. Other useful vinyl monomers include macromeric (meth)acrylates such as (meth)acrylate-terminated styrene oligomers and (meth)acrylate-terminated polyethers, such as are described in PCT Patent Application WO 84/03837 and European Patent Application EP 140941.

As described above, it may be desirable to incorporate silicone macromers into the polymeric components of this disclosure, as is described in US Patent Publication No. 2011/0039099 (Sherman et al.). Typically, the silicone macromer is incorporated into the copolymer in the amount of about 0.01 to about 50% of the total monomer weight. In some embodiments the amount of silicone macromer is 1-10 weight %, 1-5 weight % or even 3-5 weight %.

The silicone macromer can have the general formula:

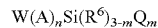

$$W(A)_n Si(R^6)_{3-m} Q_m$$

where W is a vinyl group, A is a divalent linking group, n is zero or 1, m is an integer of from 1 to 3; $R^6$ is hydrogen, lower alkyl (e.g., methyl, ethyl, or propyl), aryl (e.g., phenyl or substituted phenyl), or alkoxy, and Q is a monovalent siloxane polymeric moiety having a number average molecular weight above about 500 and is essentially unreactive under copolymerization conditions.

Such macromers are known and may be prepared by the method disclosed by Milkovich et al., as described in U.S. Pat. Nos. 3,786,116 and 3,842,059. The preparation of polydimethylsiloxane macromer and subsequent copolymerization with vinyl monomers have been described in several papers by Y. Yamashita et al., Polymer J. 14, 913 (1982); ACS Polymer Preprints 25 (1), 245 (1984); Makromol. Chem. 185, 9 (1984) and in U.S. Pat. No. 4,693,935 (Mazurek). This method of macromer preparation involves the anionic polymerization of hexamethylcyclotrisiloxane monomer to form living polymer of controlled molecular weight, and termination is achieved via chlorosilane compounds containing a polymerizable vinyl group.

The low Tg polymeric component may comprise a wide variety of materials, both polymeric and non-polymeric. The low Tg polymeric component has a glass transition temperature of less than 20° C. In some embodiments, the Tg of the low Tg polymeric component is less than 0° C., or even less than −10° C. Typically the low Tg polymeric component comprises at least one polymer. In some embodiments, the low Tg polymeric component comprises a blend or mixture of polymers. Generally, the low Tg polymeric component comprises an acid or a base functionality.

In some embodiments, the low Tg polymeric component comprises a pressure sensitive adhesive. The pressure sensitive adhesive comprises at least one polymer and may contain other additives. Often pressure sensitive adhesives comprise copolymers. To achieve pressure sensitive adhesive characteristics, the copolymer can be tailored to have a resultant Tg of less than about 0° C. Particularly preferred pressure sensitive adhesive copolymers are (meth)acrylate copolymers. Such copolymers typically are derived from monomers comprising about 40% by weight to 100% by weight of at least one alkyl (meth)acrylate monomer that, as a homopolymer, has a Tg of less than about 0° C. The copolymer may also comprise acidic, basic, or higher Tg co-monomers. More typically, the copolymers comprise at least 70% by weight, 85% by weight, or even 90% by weight, of at least one alkyl (meth)acrylate monomer that, as a homopolymer, has a Tg of less than about 0° C.

Examples of suitable alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof.

Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability, acidic monomers, if used, are typically the ethylenically unsaturated carboxylic acids. When even stronger acids are desired, acidic monomers include the ethylenically unsaturated sulfonic acids and ethylenically unsaturated phosphonic acids.

Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinyl pyrrolidone, N-vinyl caprolactam, acrylonitrile, N-vinyl formamide, (meth)acrylamide, and mixtures thereof.

Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and optional basic or acidic monomers, provided that the Tg of the resultant (meth) acrylate copolymer pressure sensitive adhesive is less than 20° C. Additionally, as described above it may be desirable to include vinyl functional silicone macromers of the type described in US Patent Publication No. 2011/0039099 (Sherman et al.).

Polymers useful for incorporation in the low Tg polymeric component can be prepared by any conventional free radical polymerization method, including solution, radiation, bulk, dispersion, emulsion, and suspension processes. In one solution polymerization method, the monomers, along with a suitable inert organic solvent, are charged into a four-neck reaction vessel that is equipped with a stirrer, a thermometer, a condenser, an addition funnel, and a thermowatch. A concentrated thermal free radical initiator solution is added to the addition funnel. The whole reaction vessel, addition funnel, and their contents are then purged with nitrogen to create an inert atmosphere. Once purged, the solution within the vessel is heated to an appropriate temperature to activate the free radical initiator to be added, the initiator is added, and the mixture is stirred during the course of the reaction. A 98% to 99% conversion can typically be obtained in about 20 hours.

Bulk polymerization methods, such as the continuous free radical polymerization method described by Kotnour et al. in U.S. Pat. Nos. 4,619,979 and 4,843,134; the essentially adiabatic polymerization methods using a batch reactor described by Ellis in U.S. Pat. No. 5,637,646; suspension polymerization processes described by Young et al. in U.S. Pat. No. 4,833,179; and, the methods described for polymerizing packaged pre-adhesive compositions described by Hamer et al. in PCT Publication No. WO 97/33945 may also be utilized to prepare the polymers.

Suitable thermal free radical initiators which may be utilized include, but are not limited to, those selected from azo compounds, such as 2,2'-azobis(isobutyronitrile); hydroperoxides, such as tert-butyl hydroperoxide; and, peroxides, such as benzoyl peroxide and cyclohexanone peroxide. Photoinitiators which are useful according to this disclosure include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalene sulfonyl chloride; and, photoactive oximes, such as 1-phenyl-1,2-propanedione-2-(ethoxycarbonyl)oxime. For both thermal- and radiation-induced polymerizations, the initiator is present in an amount of about 0.05% to about 5.0% by weight based upon the total weight of the monomers.

While the low Tg polymeric component may be prepared by solventless methods, it is often desirable that solvents are used in preparing the low Tg polymeric component. Suitable solvent, if desired, may be any liquid which is sufficiently inert to the reactants and product such that it will not otherwise adversely affect the reaction. Such solvents include ethyl acetate, acetone, methyl ethyl ketones, and mixtures thereof. Representative solvents include acetone, methyl-ethyl-ketone, heptane, and toluene. If used, the amount of solvent is generally about 30-80% by weight based on the total weight of the reactants (monomer and initiator) and solvent. The solvent may be optionally removed from the polymers prior to blending or mixing with the high Tg polymeric component.

Chain transfer agents can also be utilized when polymerizing the polymers described herein to control the molecular weight of the polymers. Suitable chain transfer agents include halogenated hydrocarbons (e.g., carbon tetrabromide) and sulfur compounds (e.g., lauryl mercaptan, butyl mercaptan, ethanethiol, and 2-mercaptoether).

The amount of chain transfer agent that is useful depends upon the desired molecular weight and the type of chain transfer agent. Organic solvents (e.g., toluene, isopropanol, and ethyl acetate) can also be used as chain transfer agents, but they generally are not as active as, for example, sulfur compounds. The chain transfer agent is typically used in amounts from about 0.001 parts to about 10 parts; more often, 0.01 to about 0.5 parts; and specifically from about 0.02 parts to about 0.20 parts based on total weight of the monomers.

To increase the cohesive strength of the low Tg polymeric component, the polymer may optionally be crosslinked. Suitable crosslinkers include polyfunctional copolymerizable monomers that cause crosslinking during polymerization, or crosslinkers can be added after polymerization and activated to crosslink the polymer. Classes of crosslinkers are discussed in greater detail below. Crosslinking may also be achieved using high energy electromagnetic radiation such as gamma or e-beam radiation without the use of crosslinking additives.

The low Tg polymeric component may contain a wide variety of additives in addition to the polymer or polymers, provided the additives cause no adverse effects to the desired properties, such as optical clarity and environmental stability over time. For example, compatible tackifiers and/or plasticizers may be added, especially if the low Tg polymeric component is a pressure sensitive adhesive. The use of such tack-modifiers is common in the art, as is described in the Handbook of Pressure Sensitive Adhesive Technology, edited by Donatas Satas (1982). Examples of useful tackifiers include, but are not limited to, rosin, rosin derivatives, polyterpene resins, coumarone-indene resins, and the like. Plasticizers which may be added to the adhesive of this disclosure may be selected from a wide variety of commercially available materials. Representative plasticizers include polyoxyethylene aryl ether, dialkyl adipate, 2-ethylhexyl diphenyl phosphate, t-butylphenyl diphenyl phosphate, 2-ethylhexyl adipate, toluenesulfonamide. dipropylene glycol dibenzoate, polyethylene glycol dibenzoate, polyoxypropylene aryl ether, dibutoxyethoxyethyl formal, and dibutoxyethoxyethyl adipate. UV stabilizers as known in the art may also be added.

The high Tg polymeric component may be a single polymer, a blend of polymers or a single polymer or blend of polymers with additional additives. To achieve the high Tg characteristics, the corresponding copolymer is typically tailored to have a resultant glass transition temperature (Tg) of greater than about 20° C. In some embodiments, the Tg of the high Tg polymeric component is greater than 40° C., 50° C., or 60° C. Generally, the high Tg polymeric component comprises acid or base functionality. In some embodiments, the high Tg polymeric component comprises a (meth) acrylate-based copolymer. Such copolymers typically are derived from monomers comprising at least about 40% by weight, typically at least 70% by weight, more typically at least 85% by weight, or even 90% by weight, of at least one alkyl (meth)acrylate monomer that, as a homopolymer, has a Tg of greater that about 20° C. The (meth)acrylate copolymer may contain additional comonomers, as long as the resulting high Tg polymeric component has a Tg of greater than 20° C. Examples of suitable comonomers include low Tg alkyl (meth)acrylate monomers, basic monomers, acidic monomers, and combinations thereof.

High Tg monomers are generally those monoethylenically unsaturated monomers which as homopolymers have a glass transition temperature (Tg) greater than about 20° C. Typically the high Tg polymer is independently derived from monoethylenically unsaturated monomers selected from the group consisting of (meth)acrylate esters of nontertiary alkyl alcohols, the alkyl groups of which comprise from about 1 to about 20, more typically 1 to about 18 carbon atoms. In most embodiments, the high Tg polymers are independently derived from (meth)acrylate monomers, although, for certain formulations, vinyl-terminated monomers, such as styrene, may show comparable or superior results. Examples of suitable monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, bromoethyl methacrylate, 2-hydroxyethyl methacrylate, hydroxypropyl methacrylate, glycidyl methacrylate, ally methacrylate, styrene, vinyl acetate, vinyl chloride, and the like.

Examples of suitable low Tg monomers include, for example, alkyl (meth)acrylate monomers with a Tg less than 0° C., such as monomers with alkyl groups comprising from about 4 carbon atoms to about 12 carbon atoms, including n-butyl acrylate, 2-ethylhexyl acrylate, isooctyl acrylate, isononyl acrylate, isodecyl acrylate, and mixtures thereof, may be utilized in conjunction with one or more of the high Tg alkyl (meth)acrylate monomers and copolymerizable basic or acidic monomers, provided that the Tg of the resultant (meth)acrylate copolymer or the high Tg polymeric component is greater than about 20° C.

In some embodiments, the high Tg polymeric component comprises a basic (meth)acrylate copolymer. Basic (meth) acrylate copolymers typically are derived from basic monomers comprising about 2% by weight to about 50% by weight, typically 5% by weight to about 30% by weight, of a copolymerizable basic monomer. Copolymerizable basic monomers were described above.

In some embodiments, the high Tg polymeric component comprises an acidic (meth)acrylate copolymer. Acidic (meth)acrylate copolymers typically are derived from acidic monomers comprising about 2% by weight to about 30% by weight, typically about 2% by weight to about 15% by weight, of a copolymerizable acidic monomer. Copolymerizable acidic monomers were described above.

In some embodiments, the copolymer of the high Tg polymeric component comprises a (meth)acrylate-based copolymer with a weight average molecular weight greater than 100,000. Higher molecular weight high Tg polymer may be desirable to enhance the thermal stability of the adhesive composition, especially at elevated temperatures and extreme conditions.

As with the low Tg polymeric component, in order to increase cohesive strength of the high Tg polymeric component, a crosslinking additive may be added to the reactive composition. Suitable crosslinkers include polyfunctional copolymerizable monomers that cause crosslinking during polymerization, or crosslinkers can be activated after polymerization to crosslink the polymer. Crosslinking may also be achieved using high energy electromagnetic radiation such as gamma or e-beam radiation without the use of crosslinking additives.

Suitable polyfunctional copolymerizable monomers include, for example, multi-functional acrylates. Examples of useful multi-functional acrylate crosslinking agents include, but are not limited to, diacrylates, triacrylates, and tetraacrylates, such as 1,6-hexanediol diacrylate, poly(ethylene glycol) diacrylates, polybutadiene diacrylate, polyurethane diacrylates, and propoxylated glycerin triacrylate, and mixtures thereof.

Two types of crosslinking additives are commonly used to effect crosslinking after polymerization. The first crosslinking additive is a thermal crosslinking additive such as a multifunctional aziridine. One example is 1,1'-(1,3-phenylene dicarbonyl)-bis-(2-methylaziridine) (Bisamide). Such chemical crosslinkers can be added into the solvent-based PSA after polymerization and activated by heat during oven drying of the coated adhesive. Isocyanate and epoxy crosslinkers can also be used.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide reagent.

The second type of chemical crosslinker is a photosensitive crosslinker which is activated by high intensity ultraviolet (UV) light. Two common photosensitive crosslinkers used are benzophenone and copolymerizable aromatic ketone monomers as described in U.S. Pat. No. 4,737,559. Another photocrosslinker, which can be post-added to the solution composition and activated by UV light is a triazine, for example, 2,4-bis(trichloromethyl)-6-(4-methoxy-pheynl)-s-triazine. These crosslinkers are activated by UV light generated from artificial sources such as medium pressure mercury lamps or a UV blacklight.

The amount and identity of crosslinker, if used, is tailored depending upon the desired application of the adhesive composition. Typically, the crosslinker is present in amounts less than 5 parts based on total dry weight of adhesive composition. Typically, the crosslinker is present in amounts from 0.01 parts to 1 part based on total dry weight of the adhesive composition.

As described above, the adhesive composition may comprise a single crosslinked polymeric composition. In many embodiments, the adhesive composition comprises a blend of low Tg and high Tg polymeric components. Each of these components may comprise a polymer or a blend of polymers and may contain additional additives. Additionally, as mentioned above, each of the polymeric components may be crosslinked, and each of the polymeric components comprises an acid or a base functionality such that upon mixing an acid-base interaction is formed. The adhesive composition itself may also contain a variety of additives. In other words, additives can be added to either or both polymeric components, or they can be added to the adhesive composition as it is being prepared or after it is prepared. Examples of suitable additives include tackifiers, plasticizers and UV stabilizers as described above. Additionally, post-polymerization crosslinking agents can be added to effect crosslinking of the adhesive composition.

The adhesive composition includes a low Tg polymeric component and a high Tg polymeric component in any relative amounts that, in combination with any other optional components, will result in a useful balance of properties of the adhesive, such as being optically transparent, and able to retain a microstructured pattern as a permanent feature of the adhesive surface. In some embodiments, the adhesive composition is a pressure sensitive adhesive. In other embodiments, the adhesive composition is not a pressure sensitive adhesive. Generally, when the adhesive composition is not a pressure sensitive adhesive it is a heat activated adhesive. Typically, the adhesive composition comprises less than 50 parts by weight of the high Tg polymeric component based on 100 parts by weight of the total adhesive composition. In some embodiments, the adhesive composition comprises less than 40 parts by weight of the high Tg polymeric component based on 100 parts by weight of the total adhesive composition, less than 30 parts by weight of the total adhesive composition or even less.

The low Tg and high Tg polymer components can be blended by traditional methods known to those skilled in the art. Such methods include mixing, mechanical rolling, hot melt blending, etc. In some embodiments, the low Tg and the high Tg polymeric components and any optional additives are mixed in solution. Examples of suitable solvents are described above.

The adhesive composition can be applied to a microstructured surface, such as a microstructured release liner or microstructured tool, by any conventional application method, including, but not limited to, extrusion coating, gravure coating, curtain coating, slot coating, spin coating, screen coating, transfer coating, brush or roller coating, and the like. The adhesive composition can be applied to the microstructured surface as a hot melt composition, a solvent-borne composition or a 100% solids composition. The adhesive layer coating can be further processed to produce the adhesive layer. The processing can include drying of the adhesive layer coating if solvent-borne, cooling of the adhesive layer coating if hot melt coated, or crosslinking of the adhesive layer. Crosslinking, if desired, can be effected by the application of heat or radiation or a combination thereof. The thickness of a coated adhesive layer, typically in the form of a liquid is in part dependent on the nature of the materials used and the specific properties desired, but those properties and the relationship of thickness to the properties is well understood in the art. Exemplary thicknesses of an adhesive layer may be in the range from about 0.05 to about 100 micrometers.

In some embodiments, it may be desirable to further modify the microstructured surface of the adhesive layer by the application of a continuous or discontinuous layer of surface modifying material to the microstructured surface of the adhesive layer. In some embodiments, this continuous or discontinuous layer of surface modifying material is applied to the microstructured surface of the microstructured release liner or microstructuring tool and is transferred to the adhesive surface when the adhesive layer is coated on the microstructured surface of the microstructured release liner or microstructuring tool. The continuous or discontinuous layer of surface modifying material may be a discrete collection of particles, a thin continuous layer, or a discontinuous thick or thin layer. Examples of suitable discrete collections of particles include non-conductive particles, conductive particles, wires, whiskers, nanomaterials, quantum dots or combinations thereof. Examples of suitable thin continuous layers include layers of detackifying agents, such as silica, talc, and the like.

The adhesive composition is optically transparent, and in some embodiments may be optically clear. Optical clarity can be measured in the number of different ways, as will be appreciated by the skilled artisan, but for the purposes of this disclosure optical clarity can be observed visually and optionally measured according to ASTM-D 1003-95. When so measured, adhesive compositions of this disclosure can exhibit a luminous transmission of at least about 90%, and haze of less than about 2%.

Besides being optically transparent or optically clear, it can be desirable in some embodiments for the adhesive composition to have a refractive index in the range of 1.4-1.8. This range is selected to match the refractive index of a variety of substrates, specifically light guides. As described above, when the transfer tapes of this disclosure are attached to the input surface of a light guide device, it can be advantageous for the adhesive composition to approximate or even to match the refractive index of the light guide input surface. This matching of refractive index helps eliminate loss of light by reflection as the light passes through the transfer tape/substrate interface.

As described above, in some embodiments the low Tg polymeric component comprises a pressure sensitive adhesive. In some embodiments, the optically transparent adhesive composition is a pressure sensitive adhesive. In other embodiments the optically transparent adhesive composition is not a pressure sensitive adhesive. Generally, when the optically transparent adhesive composition is not a pressure sensitive adhesive, it is a heat activated adhesive. It may be desirable that the optically transparent adhesive composition not be a pressure sensitive adhesive, such that it has a sufficiently high modulus to permit the microstructured surface of the adhesive layer to permanently retain the microstructured pattern as described below.

The adhesive composition comprises a microstructured pattern on at least one surface such that the microstructured pattern is a permanent feature of the adhesive surface. Being a permanent feature of the adhesive surface means that the microstructured pattern retains its shape indefinitely at the application and use temperature of the transfer tape. This permanent microstructured pattern is in contrast to typical microstructured surfaces of adhesive layers that are generally designed to be temporary. This is particularly true for optically transparent adhesives, because if the microstructures do not eventually collapse the presence of microstructures can affect the optical properties of the adhesive layer. However, the transfer tapes of the present disclosure are not designed to adhere together two substrates, they are designed to adhere to one substrate and alter the surface characteristics of that one substrate, namely by providing a permanent microstructured surface adhered to the substrate. The transfer tape is generally applied to a substrate to provide a microstructured pattern to affect the optical properties of the substrate.

As mentioned above, one particularly suitable use for the transfer tapes of this disclosure is for use with light guides. For this purpose, the transfer tape is adhered to the input surface of a light guide to provide a microstructured surface layer to the input substrate. The microstructured surface is able to spread incident light from an array of light emitting diodes in the plane of the light guide, as described above and in PCT Publication WO 2011/091026. The many advantages of using a transfer tape to create a microstructured surface on the input surface of a light guide are described above.

Since the microstructured surface of the transfer tape is used to spread incident light, it is desirable that this spread light not be altered in direction as it passes through the remainder of the adhesive layer. In other words, it is desirable that the only redirection of light provided by the adhesive layer be the spreading of light provided by the microstructured surface. For this reason, it is desirable that the adhesive layer be optically transparent or optically clear.

Figure 5A:
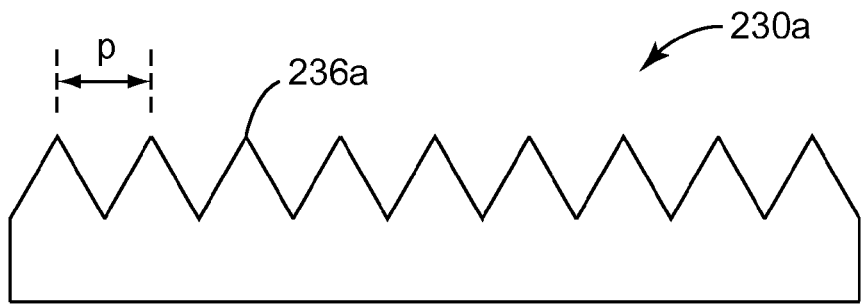
FIGS. 5A-D show schematic cross-section views of various embodiments of microstructured surfaces.
Figure 5B:
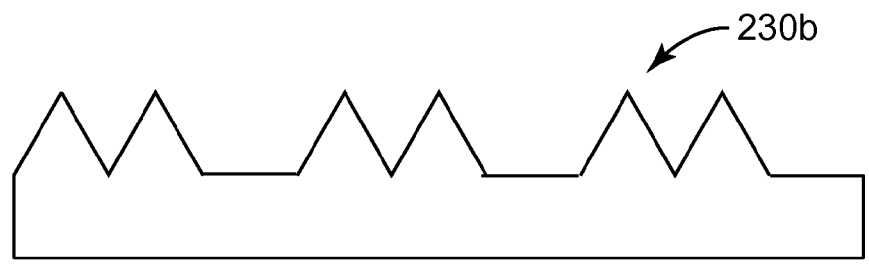

The microstructured surface may comprise a variety of microstructure shapes, including, but not limited to, symmetrical prism, intermittent arc, continuous arc, trapezoidal, lenslets, Fresnel, or sinusoidal shapes. Examples of suitable shapes are shown in FIGS. 4A-F. Additionally, the microstructured surface may comprise a variety of different structures in repeating or non-repeating patterns. Examples of such microstructured surfaces are illustrated in FIGS. 5A-D. In FIG. 5A, the microstructured surface 230a comprises a plurality of structures 236a which have triangular cross section with a pitch of p. FIG. 5B shows the microstructured surface 230b that comprises a plurality of structures with gaps between pairs of structures.

Figure 5C:
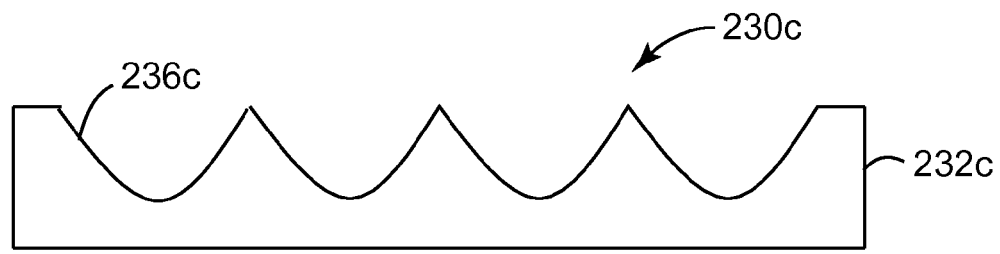

The microstructures of the microstructured surface of the transfer tapes of the present disclosure can either extend from the bulk adhesive or into the bulk adhesive as indentations. Alternatively, the structured surface layer can include a combination of structures that both extend from and into the bulk adhesive. For example, FIG. 5C is a schematic cross-section view of another embodiment of the microstructured surface 230c. The surface 230c includes a plurality of structures 236c that extend into the bulk of the transfer tape 232c and have a curved cross-sectional shape.

Figure 5D:
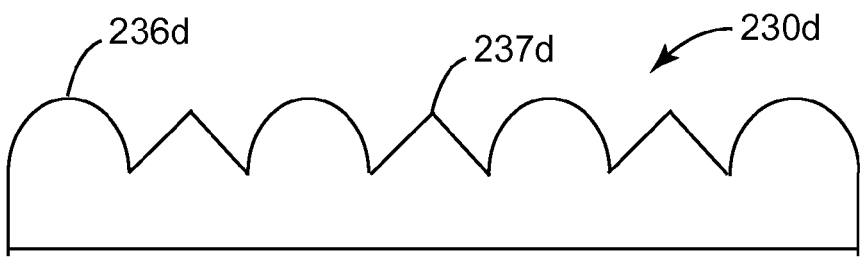

Additionally, combinations of microstructures can be used. For example, FIG. 5D is a schematic cross-section view of another embodiment of a structured surface 230d. The surface 230d includes a first set of structures 236d and a second set of structures 237d that are different from the first set of structures. First group of structures 236d includes structures having a curved or circular cross section. Each of the structures of the second set of structures 237d has a triangular cross-section. In some embodiments, the first and second sets of structures can include one or more cross sectional shapes, and the shapes of the first set of structures can have different sizes and/or pitches from the second set of structures.

In some embodiments, it may be desirable that the microstructure layer be deformable. For the purposes of this disclosure, a deformable microstructured layer means that an article can be brought in contact with the microstructured surface causing deformation of the microstructures without causing the destruction of the microstructures. Such deformation is reversible, meaning that upon removal of the article, the microstructures essentially return to their original shape and configuration. This deformability can be useful in embodiments where a light source (such as an LED) or another article such as a lens or protective plate may contact the microstructured surface either temporarily during handling or as part of the final configuration of an article or device.

Also disclosed herein are methods for preparing articles using transfer tapes. These articles utilize the transfer tape to modify the surface of a substrate, and do not utilize the transfer tape to bond two substrates together. These articles take advantage of the optical clarity and permanent microstructured surface layer of the transfer tape.

The method for preparing articles comprise preparing a transfer tape comprising an adhesive layer and a release liner, attaching the transfer tape to a substrate, and removing the release liner of the transfer tape. The transfer tape, as described above, comprises an adhesive layer with a first major surface and a second major surface, with at least one of major surfaces comprising a microstructured pattern on the surface such that the microstructured pattern is a permanent feature of the adhesive surface. The adhesive layer is an optically transparent composition, comprising a low Tg polymeric component with a Tg of less than 20° C., and a high Tg polymeric component with a Tg of greater than 20° C. The adhesive surface with a microstructured pattern is attached to a microstructured release liner. Upon removal of the microstructured release liner, microstructured pattern remains a permanent feature of the adhesive surface.

Surface-modified articles are also included in this disclosure. These articles include a substrate with at least one exterior surface, and a transfer tape of this disclosure adhered to the substrate surface. When adhered to the substrate surface, the transfer tape modifies the substrate surface by providing a permanently microstructured exterior surface. This permanently microstructured exterior surface becomes the exterior surface of the substrate upon the bonding of the transfer tape to the substrate surface. In some embodiments, the substrate and the adhesive layer have refractive indices that are within 0.1 of each other. In some embodiments, the substrate and the adhesive layer have refractive indices that are within 0.05 of each other.

In some embodiments, the surface to which the transfer tape is applied comprises the input surface of a light guide, and therefore the resulting article is a light guide. Light guides have been described above. The light guides formed by the methods of this disclosure have a microstructured surface on the input surface. This microstructured surface helps to spread out incoming light and provide a more uniformly bright output light.

The use of the transfer tape to provide a permanently microstructured surface to the input surface of the light guide has many benefits, as discussed above, because the adhesive to bond the microstructured surface to the input surface is a unitary construction instead of two separate elements. Additionally, the transfer tape, through adhesive formulation techniques, can be tailored to match the refractive index of the input surface to help reduce the loss of input light intensity.

Figure 2:
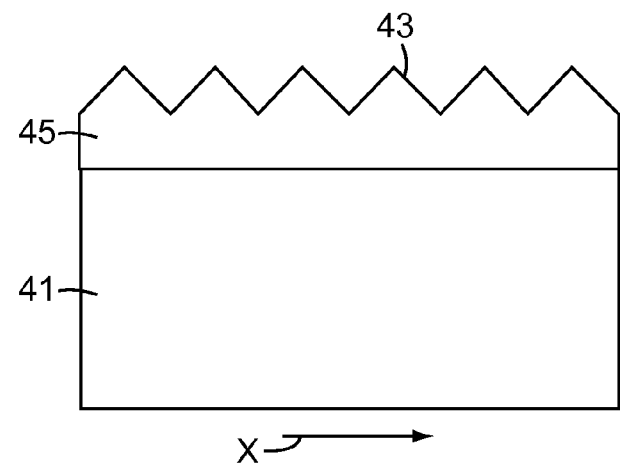
FIG. 2 shows a schematic plan view of another embodiment of a light guide module.
Figure 3:
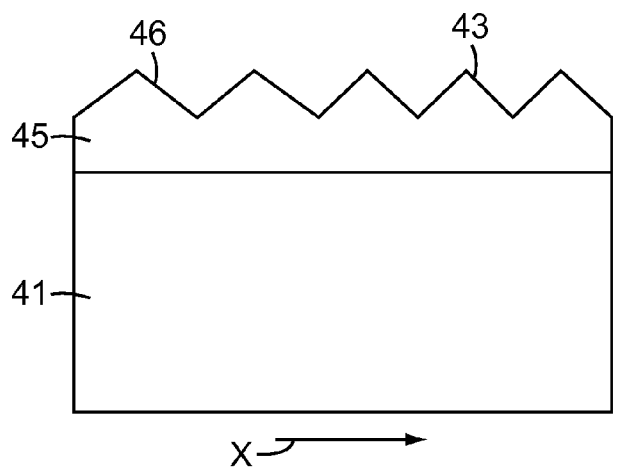
FIG. 3 shows a schematic plan view of another embodiment of a light guide module.
Figure 4A:
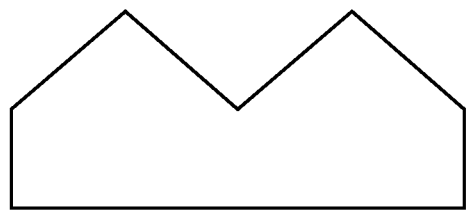
FIGS. 4A-F show schematic cross-sectional views of various embodiments of microstructured surfaces.
Figure 4B:
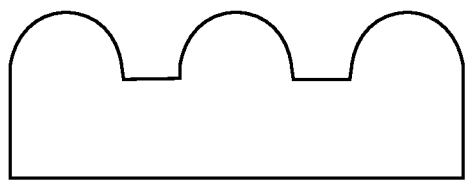
Figure 4C:
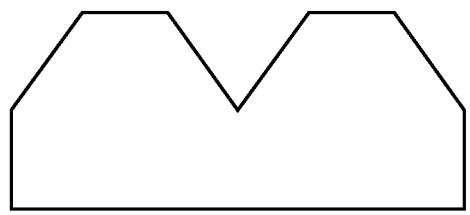
Figure 4D:
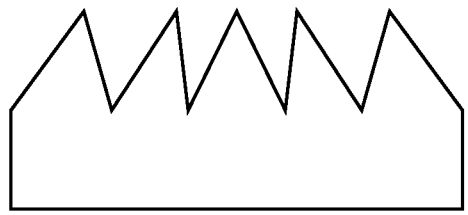
Figure 4E:
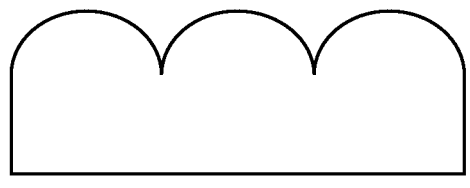
Figure 4F:
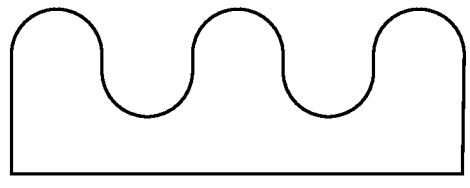

Some articles that may be prepared using the transfer tapes and methods of this disclosure are shown in FIGS. 1-3. FIG. 1 illustrates an embodiment of a light guide module, FIGS. 2 and 3 show a close up of exemplary transfer tapes of this disclosure adhered to a light guide module.

FIG. 1 illustrates one embodiment of a light guide module. The light guide module 4 includes a light guide 1 having an input surface 11 to receive light and a transfer tape 2. The tape 2 includes a first surface 12 and a second surface 13. The first surface 12 is attached to the input surface 11 of light guide 1 (for clarity, the first surface 12 is not shown attached to input surface 11 in this Figure). The second surface 13 includes microstructures 21 that are operable to spread incident light in the plane of the light guide 1. The second surface 13 is configured to receive incident light from one or more light sources.

FIG. 1 also illustrates the working layout of the foregoing light guide module 4 as used in a backlight that can provide illumination to an LC display, sign, etc. The backlight can include an array of light emitting diodes 3, where a distance between two adjacent single-point light emitting diodes (in array 3) can be an suitable value, e.g., greater than 5 mm, 10 mm, 15 mm, 20 mm, or greater. The array of light emitting diodes 3 is placed in parallel with and faces the second surface 13 so that at least a portion of light emitted from the array 3 will enter the light guide plate 4 through the second surface 13. Light emitted from the array 3 enters light guide module 4 though the second surface 13, and provides backlighting, e.g., to the entire liquid crystal display panel through light guide 1. Due to the role of microstructures 21, light emitted from the array 3 is spread in the plane of the light guide 1, thereby increasing the uniformity of light intensity proximate the light incident area of the light guide, thereby increasing the efficiency of backlighting design. In some embodiments, the light emitting surfaces of the array 3 can be placed in parallel with and facing the input surface 11 of the light guide 1 so as to ensure that light enters vertically into the light guide plate module further improving the radiation efficiency of the light guide module 4.

Microstructures 21, as illustrated in FIG. 1, are symmetrical prism microstructures. It should be noted that the dimensions of the microstructures illustrated in FIG. 1 are exaggerated for the sake of clarity. The specific dimensions of the prism structures can be chosen based on individual needs.

FIGS. 2-3 illustrate various embodiments of light guide modules using transfer tapes of this disclosure.

FIG. 2 illustrates an embodiment of a light guide 41. The light guide 41 has attached to it transfer tape 45. Transfer tape 45 comprises a structured surface with microstructures 43. FIG. 3 is very similar to FIG. 2, except that in FIG. 3, transfer tape 45 comprises a structured surface with two different microstructure patterns, 46 and 43. The two different microstructure patterns vary in the prism angles of the structures.

The present disclosure includes the following embodiments.

Among the embodiments are transfer tapes. A first embodiment includes a transfer tape comprising: an adhesive layer with a first major surface and a second major surface, comprising an optically transparent composition, the optically transparent composition comprising: a crosslinked polymeric composition, wherein at least one of the first major surface or the second major surface comprises a microstructured pattern on the surface such that the microstructured pattern is a permanent feature of the adhesive surface, and wherein the microstructured surface alters the direction of light.

Embodiment 2 is the transfer tape of embodiment 1, wherein the crosslinked polymeric composition comprises: a low Tg polymeric component with a Tg of less than 20° C., and an acid or base functionality; and a high Tg polymeric component with a Tg of greater than 20° C., and an acid or base functionality, wherein the functionality of the low Tg polymeric component and the functionality of the high Tg polymeric component form an acid-base interaction when mixed.

Embodiment 3 is the transfer tape of embodiment 2, wherein the low Tg polymeric component comprises a pressure sensitive adhesive.

Embodiment 4 is the transfer tape of embodiment 3, wherein the pressure sensitive adhesive comprises a (meth)acrylate-based pressure sensitive adhesive.

Embodiment 5 is the transfer tape of any of embodiments 2-4, wherein the low Tg polymeric component has a Tg of less than 0° C.

Embodiment 6 is the transfer tape of any of embodiments 2-5, wherein the low Tg polymeric component has a Tg of less than −10° C.

Embodiment 7 is the transfer tape of any of embodiments 2-6, wherein the low Tg component is silicone-modified.

Embodiment 8 is the transfer tape of any of embodiments 2-7, wherein the high Tg polymeric component comprises at least one (meth)acrylate-based polymer with a Tg of greater than 20° C.

Embodiment 9 is the transfer tape of any of embodiments 2-8, wherein the high Tg polymeric component comprises at least one (meth)acrylate-based polymer with a Tg of greater than 40° C.

Embodiment 10 is the transfer tape of any of embodiments 2-9, wherein the high Tg polymeric component comprises at least one (meth)acrylate-based polymer with a Tg of greater than 50° C.

Embodiment 11 is the transfer tape of any of embodiments 2-11, wherein the high Tg polymeric component comprises at least one (meth)acrylate-based polymer with a Tg of greater than 60° C.

Embodiment 12 is the transfer tape of any of embodiments 2-11, wherein the optically transparent composition comprises: 50-80% by weight low Tg polymeric component; and 20-50% by weight high Tg polymeric component.

Embodiment 13 is the transfer tape of any of embodiments 1-12, wherein the adhesive layer is not a pressure sensitive adhesive layer.

Embodiment 14 is the transfer tape of any of embodiments 1-13, wherein the adhesive layer has refractive index in the range of 1.4-1.8.

Embodiment 15 is the transfer tape of any of embodiments 1-14, wherein the refractive index of the adhesive layer and the refractive index of a substrate to which it is to be adhered are within 0.1 of each other.

Embodiment 16 is the transfer tape of any of embodiments 1-15, wherein the refractive index of the adhesive layer and the refractive index of a substrate to which it is to be adhered are within 0.05 of each other.

Embodiment 17 is the transfer tape of any of embodiments 1-16, further comprising a microstructured release liner attached to the microstructured surface of the adhesive layer.

Among the embodiments are methods for preparing articles. Embodiment 18 is a method for preparing an article comprising: preparing a transfer tape comprising an adhesive layer and a release liner; attaching the transfer tape to a substrate; and removing the release liner of the transfer tape, wherein the transfer tape comprises an adhesive layer with a first major surface and a second major surface, comprising an optically transparent composition, the optically transparent composition comprising: a crosslinked polymeric composition, wherein at least one of the first major surface or the second major surface comprises a microstructured pattern on the surface such that the microstructured pattern is a permanent feature of the adhesive surface, and wherein the microstructured surface alters the direction of light.

Embodiment 19 is the method of embodiment 18, wherein the crosslinked polymeric composition comprises: a low Tg polymeric component with a Tg of less than 20° C., and an acid or base functionality; and a high Tg polymeric component with a Tg of greater than 20° C., and an acid or base functionality, wherein the functionality of the low Tg polymeric component and the functionality of the high Tg polymeric component form an acid-base interaction when mixed.

Embodiment 20 is the method of embodiment 18 or 19, wherein preparing the transfer tape comprises: providing a microstructured release liner; and coating a layer of an optically transparent composition onto the microstructured surface of the release liner.

Embodiment 21 is the method of embodiment 20, wherein coating a layer of optically transparent composition onto the microstructured surface of the release liner comprises hot melt coating, solvent-borne coating, or 100% solids coating.

Embodiment 22 is the method of embodiment 20 or 21, further comprising drying, curing or crosslinking of the coated layer.

Embodiment 23 is the method of any of embodiments 20-22, wherein the microstructured release liner further comprises a continuous or discontinuous layer of material on the microstructured surface of the release liner.

Embodiment 24 is the method of embodiment 23, wherein the continuous or discontinuous layer of material on the microstructured surface of the release liner comprise a discrete collection of particles, a thin continuous layer, or a discontinuous thick or thin layer.

Embodiment 25 is the method of embodiment 24, wherein the discrete collection of particles comprise non-conductive particles, conductive particles, wires, whiskers, nanomaterials, quantum dots, or combinations thereof.

Embodiment 26 is the method of embodiment 24, wherein the thin continuous layer comprises a layer of detackifying agent.

Embodiment 27 is the method of any of embodiments 18-26, wherein the substrate comprises the input surface of a light guide.

Among the embodiments are articles. Embodiment 28 is an article comprising: a substrate with at least one exterior surface; and a transfer tape adhered to the substrate surface, the transfer tape comprising: an adhesive layer with a first major surface and a second major surface, comprising an optically transparent composition, the optically transparent composition comprising: a crosslinked polymeric composition, wherein at least one of the first major surface or the second major surface comprises a microstructured pattern on the surface such that the microstructured pattern is a permanent feature of the adhesive surface, and wherein the microstructured surface alters the direction of light.

Embodiment 29 is the article of embodiment 28, wherein the crosslinked polymeric composition comprises: a low Tg polymeric component with a Tg of less than 20° C., and an acid or base functionality; and a high Tg polymeric component with a Tg of greater than 20° C., and an acid or base functionality, wherein the functionality of the low Tg polymeric component and the functionality of the high Tg polymeric component form an acid-base interaction when mixed.

Embodiment 30 is the article of embodiment 28 or 29, wherein the substrate and the adhesive layer have refractive indices that are within 0.1 of each other.

Embodiment 31 is the article of embodiment 29 or 30, wherein the low Tg polymeric component comprises at least one (meth)acrylate-based polymer.

Embodiment 32 is the article of any of embodiments 29-31, wherein the high Tg polymeric component comprises at least one (meth)acrylate-based polymer.

Embodiment 33 is the article of any of embodiments 29-32, wherein the optically transparent composition comprises: 50-80% by weight low Tg polymeric component; and 20-50% by weight of high Tg polymeric component.

Embodiment 34 is the article of any of embodiments 28-32, wherein the adhesive layer is not a pressure sensitive adhesive layer.

Embodiment 35 is the article of any of embodiments 28-34, further comprising a microstructured release liner attached to the microstructured surface of the adhesive layer.

Embodiment 36 is the article of any of embodiments 28-35, wherein the microstructured pattern that is a permanent feature of the adhesive surface, is deformable, such that contact of an article to the microstructured pattern on the adhesive surface causes reversible deformation of microstructured pattern.

Embodiment 37 is the article of any of embodiments 28-36, wherein the article comprises a light guide.

Embodiment 38 is the article of any of embodiments 28-36, wherein the article comprises a luminaire.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations/Materials

| Abbreviation or Trade Designation | Description |
|---|---|
| PSA | (Meth)acrylate pressure sensitive adhesive solution, prepared as described in U.S. Patent Publication No. 2004/0202879 (Xia et al.) as "PSA-1", containing a copolymer PSA with an approximate ratio of monomers of 93/7 IOA/AA. |
| IOA | Iso-octyl acrylate |
| AA | Acrylic acid |
| Polymer | (Meth)acrylate polymer solution, 40% solids by weight, prepared as described in U.S. Patent Publication No. 2004/0202879 (Xia et al.) as "Polymer Additive 1", containing MMA/BMA/DMAEMA in the ratio (69/25/6) and having a molecular weight of ~140,000 g/mol. |
| MMA | Methyl methacrylate |
| BMA | n-butyl methacrylate |
| DMAEMA | (N,N-dimethylamino)ethyl methacrylate |
| Embossed | Embossed release liner, 94 pound white polycoated Kraft |

-continued

Table of Abbreviations/Materials

| Abbreviation or Trade Designation | Description |
|---|---|
| Liner | liner paper coated on both sides with polyethylene and available from Loparex, LLC, Cary, NC, embossed with the pattern from BEF II 90/50 prismatic film available from 3M Company, St. Paul MN. |
| Release Liner | Single side release (silicone coated) polyester liner, 50 micrometers thick commercially available as CLEARSIL T10 from CPI Films St. Louis, MO. |
| Light Guide | Optix Acrylic Sheet - polymeric MMA Sheet 1.27 cm thick, commercially available from Plaskolite, Inc, Columbus, OH. |
| Light Source | Scholly 150H Universal Fiber Optic Light Source Scholly GmbH, Germany. |

Preparation of Microstructured Liner (Embossed Liner)

1. Release Coating of Liner

A sample of 94 pound white polycoated Kraft liner paper coated on both sides with polyethylene and available from Loparex was solvent coated with a solvent-based silicone release material at a coating weight of 0.4-0.5 g/m² on each side.

2. Embossing

The release coated liner prepared above was embossed to give it a microstructured pattern. A Wabash platen press was preheated to a temperature of 110° C. The following stack was created with the liner to be embossed and the tool used for embossing: 35.6 cm×35.6 cm cardboard piece 1 mm thick/30.5 cm×30.5 cm chrome plated polished steel plate 2 mm thick/50.8 micron PET silicone release liner/tool/liner to be embossed/30.5 cm×30.5 cm chrome plated polished steel plate 2 mm thick/35.6 cm×35.6 cm cardboard piece 1 mm thick. This stack was placed between the top and bottom platens. The platens were brought together, and the stack was pre-pressed for 3 minutes at 34 MPa (5000 psi), followed by high pressure at 552 MPa (40 tons) for another 3 minutes. The stack was then cooled at least 20 degrees below press temperature while under high pressure, and then removed from the press. The microstructured surface that was embossed into the liner comprised the pattern from BEF II 90/50 prismatic film available from 3M Company, St. Paul Minn.

Formulation and Sample Preparation

The PSA and Polymer were combined and mixed for 4 hours in the ratio of 88% PSA and 12% Polymer dry weight to dry weight. This solvent/polymer mixture was cast onto the Embossed Liner and dried in a forced air oven at 70° C. for 10 minutes. The resulting adhesive had a dry coating thickness of 25-50 microns (PSA layer on the Embossed Liner). A sample of single sided Release Liner was laminated to the exposed (flat) side of the PSA to keep the PSA surface clean. Strips of 1.27 cm width were cut from this laminate construction. The samples were cut so that the BEF II pattern in the PSA would create vertical pyramidal ridges when applied to the light guide edge. The Release Liner was removed from the cut sample, exposing the flat surface of the PSA and this was pressed on to a portion of the edge of an acrylic PMMA sheet (light guide). The PSA/Embossed Liner strip was adhered to the edge of the light guide. The Embossed Liner was removed to expose the microstructured PSA surface that was shaped from the liner's BEF II pattern (see FIG. 2). Two fiber optic light sources were placed about 3.8 cm apart at the edge of the light guide. One light source was directed at the light guide edge with the patterned adhesive. The other was directed to a portion of the edge without the patterned adhesive.

Figure 6:
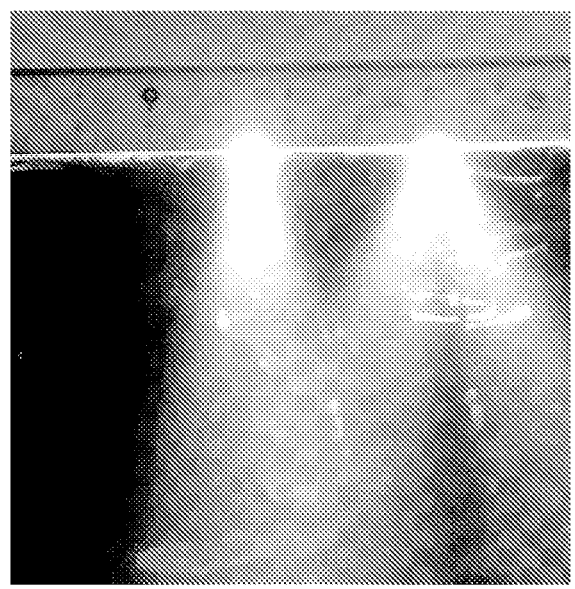
FIG. 6 shows a photo of an exemplary embodiment of a light guide.

Results:

Light that struck the structured surface of the patterned adhesive was observed to spread in the light guide more that the light entering from the edge without the pattered adhesive. See FIG. 6, where the light pattern on the left side of the photo is the region without the patterned adhesive and the light pattern on the right side of the photo is the region with the patterned adhesive.

What is claimed is:

1. A transfer tape comprising:
a pressure sensitive adhesive layer with a thickness of from 0.05-100 micrometers with a first major surface and a second major surface, comprising an optically transparent composition, the optically transparent composition comprising:
a crosslinked polymeric composition, wherein the crosslinked polymeric composition comprises:
a low Tg polymeric component with a Tg of less than 20° C., and an acid or base functionality; and
a high Tg polymeric component with a Tg of greater than 20° C., and an acid or base functionality, wherein the functionality of the low Tg polymeric component and the functionality of the high Tg polymeric component form an acid-base interaction when mixed,
wherein at least one of the first major surface or the second major surface comprises a microstructured pattern on the surface such that the microstructured pattern is a permanent feature of the pressure sensitive adhesive surface, and wherein the microstructured surface alters the direction of light.

2. The transfer tape of claim 1, wherein the low Tg polymeric component comprises a pressure sensitive adhesive.

3. The transfer tape of claim 2, wherein the pressure sensitive adhesive comprises a (meth)acrylate-based pressure sensitive adhesive.

4. The transfer tape of claim 1, wherein the low Tg polymeric component is silicone-modified.

5. The transfer tape of claim 1, wherein the high Tg polymeric component comprises at least one (meth)acrylate-based polymer with a Tg of greater than 20° C.

6. The transfer tape of claim 1, wherein the optically transparent composition comprises:
50-80% by weight low Tg polymeric component; and
20-50% by weight high Tg polymeric component.

7. The transfer tape of claim 1, wherein the pressure sensitive adhesive layer has refractive index in the range of 1.4-1.8.

8. The transfer tape of claim 1, further comprising a microstructured release liner attached to the microstructured surface of the pressure sensitive adhesive layer.

9. A method for preparing an article comprising:
preparing a transfer tape comprising a pressure sensitive adhesive layer with a thickness of from 0.05-100 micrometers and a release liner;
attaching the transfer tape to a substrate; and
removing the release liner of the transfer tape,
wherein the transfer tape comprises a pressure sensitive adhesive layer with a first major surface and a second major surface, comprising an optically transparent composition, the optically transparent composition comprising:

a crosslinked polymeric composition, wherein the crosslinked polymeric composition comprises:
  a low Tg polymeric component with a Tg of less than 20° C., and an acid or base functionality; and
  a high Tg polymeric component with a Tg of greater than 20° C., and an acid or base functionality, wherein the functionality of the low Tg polymeric component and the functionality of the high Tg polymeric component form an acid-base interaction when mixed,
wherein at least one of the first
major surface or the second major surface comprises a microstructured pattern on the surface such that the microstructured pattern is a permanent feature of the pressure sensitive adhesive surface, and wherein the microstructured surface alters the direction of light.

10. The method of claim 9, wherein preparing the transfer tape comprises:
  providing a microstructured release liner; and
  coating a layer of an optically transparent composition onto the microstructured surface of the release liner.

11. The method of claim 10, wherein coating a layer of optically transparent composition onto the microstructured surface of the release liner comprises hot melt coating, solvent-borne coating, or 100% solids coating.

12. The method of claim 10, further comprising drying, curing or crosslinking of the coated layer.

13. The method of claim 10, wherein the microstructured release liner further comprises a continuous or discontinuous layer of material on the microstructured surface of the release liner.

14. An article comprising:
  a substrate with at least one exterior surface; and
  a transfer tape adhered to the substrate surface, the transfer tape comprising: a pressure sensitive adhesive layer with a thickness of from 0.05-100 micrometers with a first major surface and a second major surface, comprising an optically transparent composition, the optically transparent composition comprising:
    a crosslinked polymeric composition, wherein the crosslinked polymeric composition comprises:
      a low Tg polymeric component with a Tg of less than 20° C., and an acid or base functionality; and
      a high Tg polymeric component with a Tg of greater than 20° C., and an acid or base functionality, wherein the functionality of the low Tg polymeric component and the functionality of the high Tg polymeric component form an acid-base interaction when mixed,
    wherein at least one of the first major surface or the second major surface comprises a microstructured pattern on the surface such that the microstructured pattern is a permanent feature of the pressure sensitive adhesive surface, and wherein the microstructured surface alters the direction of light.

15. The article of claim 14, wherein the substrate and the pressure sensitive adhesive layer have refractive indices that are within 0.1 of each other.

16. The article of claim 14, wherein the low Tg polymeric component comprises at least one (meth)acrylate-based polymer.

17. The article of claim 14, wherein the high Tg polymeric component comprises at least one (meth)acrylate-based polymer.

18. The article of claim 14, wherein the optically transparent composition comprises:
  50-80% by weight low Tg polymeric component; and
  20-50% by weight of high Tg polymeric component.

19. The article of claim 14, wherein the microstructured pattern that is a permanent feature of the pressure sensitive adhesive surface, is deformable, such that contact of an article to the microstructured pattern on the pressure sensitive adhesive surface causes reversible deformation of microstructured pattern.

20. The article of claim 14, wherein the article comprises a light guide.

* * * * *

UNITED STATES PATENT AND TRADEMARK OFFICE
CERTIFICATE OF CORRECTION

PATENT NO. : 9,879,157 B2  
APPLICATION NO. : 14/349020  
DATED : January 30, 2018  
INVENTOR(S) : Audrey Sherman Page 1 of 1

It is certified that error appears in the above-identified patent and that said Letters Patent is hereby corrected as shown below:

On the Title Page

At Item (74):
<u>Column 2</u>
Line 1, Delete "Olofsen" and insert -- Olofson --, therefor.

Signed and Sealed this
Twenty-ninth Day of October, 2019

Andrei Iancu
*Director of the United States Patent and Trademark Office*